United States Patent
Du et al.

(10) Patent No.: US 12,278,770 B2
(45) Date of Patent: Apr. 15, 2025

(54) METHOD, ELECTRONIC DEVICE AND COMPUTER PROGRAM PRODUCT FOR DATA TRANSMISSION

(71) Applicant: EMC IP Holding Company LLC, Hopkinton, MA (US)

(72) Inventors: Fang Du, Guangyuan (CN); Xu Chen, Chengdu (CN); Hao Wang, Chengdu (CN); Pan Xiao, Chengdu (CN); Si Zhang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 431 days.

(21) Appl. No.: 17/517,898

(22) Filed: Nov. 3, 2021

(65) Prior Publication Data

US 2022/0337527 A1     Oct. 20, 2022

(30) Foreign Application Priority Data

Apr. 15, 2021 (CN) .......................... 202110407902.7

(51) Int. Cl.
    *H04L 47/25*            (2022.01)
    *H04L 47/24*            (2022.01)
    *H04L 47/2441*         (2022.01)

(52) U.S. Cl.
    CPC .......... *H04L 47/25* (2013.01); *H04L 47/2441* (2013.01); *H04L 47/2458* (2013.01)

(58) Field of Classification Search
    CPC ..... H04L 47/00; H04L 47/25; H04L 47/2441; H04L 47/2458; H04W 28/22
    See application file for complete search history.

(56) References Cited

U.S. PATENT DOCUMENTS

| | | | |
|---|---|---|---|
| 6,529,476 B1* | 3/2003 | Magnussen | H04L 49/3027 370/414 |
| 7,920,472 B2* | 4/2011 | Porat | H04L 47/762 370/398 |
| 10,871,913 B1 | 12/2020 | Ippatapu | |
| 2009/0196294 A1* | 8/2009 | Black | H04L 47/10 370/394 |

(Continued)

FOREIGN PATENT DOCUMENTS

| CN | 1263675 | 8/2000 |
|---|---|---|
| CN | 101262651 | 9/2008 |

(Continued)

*Primary Examiner* — Jung H Park
(74) *Attorney, Agent, or Firm* — BainwoodHuang

(57) ABSTRACT

Techniques for data transmission involve obtaining respective data transmission characteristics of a set of to-be-processed data transmission jobs, the data transmission characteristics of each data transmission job indicating at least one of an expected transmission time and a data size of the data transmission job; determining corresponding weights of the set of data transmission jobs based on the data transmission characteristics of the set of data transmission jobs; and determining a transmission rate of each data transmission job based on the weights and a total transmission rate used for the set of data transmission. Accordingly, different transmission rates may be assigned to different data transmission jobs, thereby increasing a recovery point objective (RPO) completion rate before a failure occurs.

11 Claims, 5 Drawing Sheets

(56) References Cited

U.S. PATENT DOCUMENTS

| | | | | |
|---|---|---|---|---|
| 2010/0128605 | A1* | 5/2010 | Chavan | H04L 47/10 370/230.1 |
| 2012/0294611 | A1* | 11/2012 | Adler | H04Q 11/0067 398/45 |
| 2020/0133804 | A1 | 4/2020 | Du et al. | |
| 2020/0322703 | A1* | 10/2020 | Bures | G06N 20/00 |
| 2020/0348845 | A1 | 11/2020 | Chen et al. | |
| 2021/0034484 | A1 | 2/2021 | Meiri et al. | |

FOREIGN PATENT DOCUMENTS

| | | |
|---|---|---|
| CN | 103580966 | 2/2014 |
| CN | 107079331 | 8/2017 |
| CN | 111125241 | 5/2020 |

* cited by examiner

METHOD, ELECTRONIC DEVICE AND COMPUTER PROGRAM PRODUCT FOR DATA TRANSMISSION

CROSS-REFERENCE TO RELATED APPLICATION

This application claims priority to Chinese Patent Application No. CN202110407902.7, on file at the China National Intellectual Property Administration (CNIPA), having a filing date of Apr. 15, 2021, and having "METHOD, ELECTRONIC DEVICE AND COMPUTER PROGRAM PRODUCT FOR DATA TRANSMISSION" as a title, the contents and teachings of which are herein incorporated by reference in their entirety.

TECHNICAL FIELD

Embodiments of the present disclosure relate to the field of data management, and in particular, to a method, an electronic device, and a computer program product for data transmission.

BACKGROUND

With the development of computer technologies, increasingly more computer devices are used. During the use of a computer, a lot of data will be generated. Sometimes, data generated by the computer is very important to a user, so the data needs to be transmitted and backed up to recover the backup data in the event of device failure or damage.

Currently, task backup is usually achieved through asynchronous replication for long-distance data transmission. In order to ensure a Recovery Point Objective (RPO) set by a user, data is usually backed up according to the RPO. However, there are still many problems to be solved in this process, for example, data transmission often cannot be completed within a time set by the user.

SUMMARY OF THE INVENTION

Embodiments of the present disclosure provide a method, an electronic device, and a computer program product for data transmission.

According to a first aspect of the present disclosure, a method for data transmission is provided. The method includes: obtaining respective data transmission characteristics of a set of to-be-processed data transmission jobs, the data transmission characteristics of each data transmission job indicating at least one of an expected transmission time and a data size of the data transmission job; determining corresponding weights of the set of data transmission jobs based on the data transmission characteristics of the set of data transmission jobs; and determining a transmission rate of each data transmission job based on the weights and a total transmission rate used for the set of data transmission.

According to a second aspect of the present disclosure, an electronic device is provided. The electronic device includes at least one processor; and a memory, coupled to the at least one processor and having instructions stored thereon. The instructions, when executed by the at least one processor, cause the device to perform actions, and the actions include: obtaining respective data transmission characteristics of a set of to-be-processed data transmission jobs, the data transmission characteristics of each data transmission job indicating at least one of an expected transmission time and a data size of the data transmission job; determining corresponding weights of the set of data transmission jobs based on the data transmission characteristics of the set of data transmission jobs; and determining a transmission rate of each data transmission job based on the weights and a total transmission rate used for the set of data transmission.

According to a third aspect of the present disclosure, a computer program product is provided, which is tangibly stored on a non-volatile computer-readable medium and includes machine-executable instructions. The machine-executable instructions, when executed, cause a machine to perform steps of the method in the first aspect of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components.

The same or corresponding reference numerals in the various drawings represent the same or corresponding portions.

DETAILED DESCRIPTION

Figure 1:
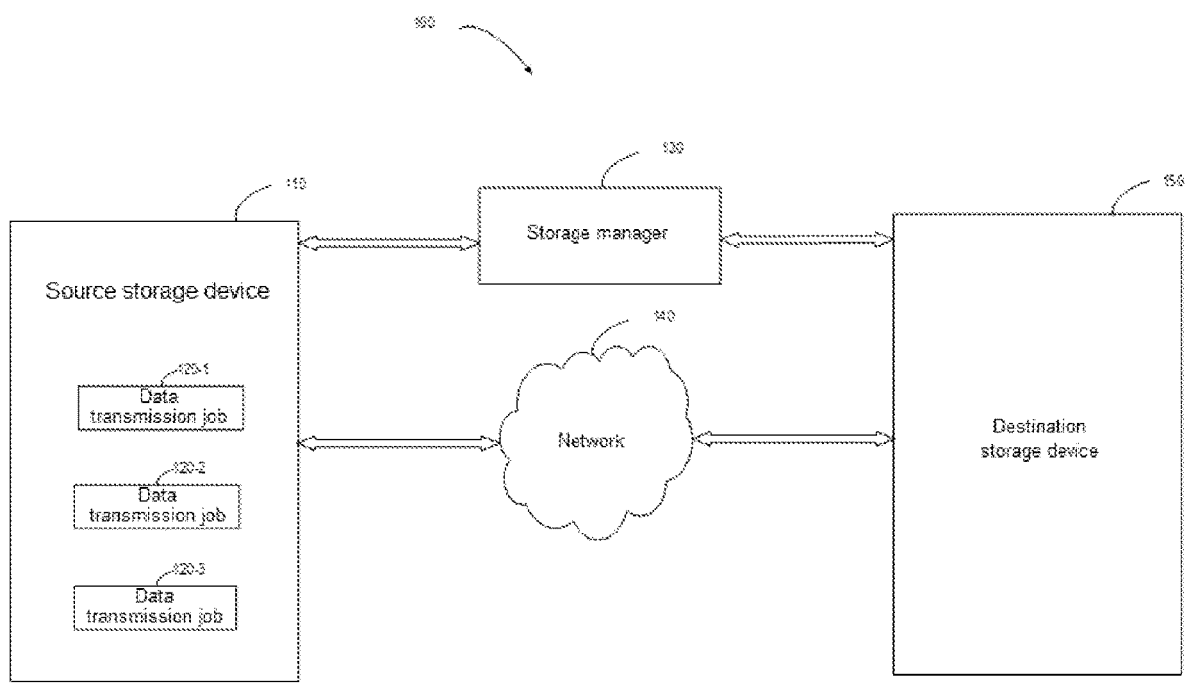
FIG. 1 shows a schematic diagram of data transmission environment 100 in which a method for data transmission in some embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be construed as "at least one embodiment." The terms "first," "second," and the like may refer to different or the same objects. Other explicit and implicit definitions may also be included below.

The principles of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and then implement the present disclosure, and are not intended to impose any limitation to the scope of the present disclosure.

In conventional data transmission or backup, if there are multiple data transmission jobs, a transmission rate of a system is usually evenly assigned to each data transmission job. However, different data transmission jobs may have different expected transmission times (such as recovery point objectives). In addition, each data transmission job often has a different data size. Data transmission cannot be completed within the expected transmission time sometimes by simply assigning the same transmission rate to different data transmission jobs. Therefore, conventional data transmission methods cannot bring good user experiences.

In order to solve the above and other potential problems, the present disclosure provides a method for data transmission. In this method, data transmission characteristics of each data transmission job in a set of to-be-processed data transmission jobs are obtained at first, and the data transmission characteristics may be an expected transmission time and a data size of a data transmission job. Then, according to the above data transmission characteristics, a weight of each data transmission job in the set of data transmission jobs is determined. Finally, a transmission rate of each data transmission job is determined according to the weight determined above and a total transmission rate (for example, the total transmission rate of the system) used for the set of data transmission. By this method, different transmission rates can be assigned to different data transmission jobs according to the data transmission characteristics, so that the data transmission job can be completed within an expected time, thereby increasing a recovery point objective (RPO) completion rate before a failure occurs.

FIG. 1 shows a schematic diagram of data transmission environment 100 in which a method for data transmission in some embodiments of the present disclosure can be implemented. Data transmission environment 100 includes source storage device 110, data transmission jobs 120-1, 120-2, and 120-3 (hereinafter may be referred to as a set of data transmission jobs 120), storage manager 130, network 140, and destination storage device 150. It should be noted that data transmission environment 100 is only an example and is not limiting, and it is extensible, may include more source storage devices and data transmission jobs and may even include more destination storage devices, and therefore can meet data transmission requirements of more users simultaneously.

In data transmission environment 100, source storage device 110 interacts with destination storage device 150 over network 140. In an example, source storage device 110 may use asynchronous replication (for example, a Unity snapshot-based replication implementation) to execute a data transmission job over network 140 so as to transmit data to destination storage device 150.

Storage manager 130 is used to perform various operations associated with data transmission. In some embodiments, storage manager 130 may obtain data transmission characteristics of a set of data transmission jobs 120, and assign a transmission rate to the data transmission jobs according to the data transmission characteristics. The transmission data rate is, for example, a maximum available transmission rate of a file system or a transmission rate preset by a user, which is not limited here in the present disclosure. In some embodiments, storage manager 130 may assign a storage space in destination storage device 150 for storing the transmitted data. It should be noted that although storage manager 130 is shown as being outside of source storage device 110 and destination storage device 150, it may also be local relative to source storage device 110 and destination storage device 150.

In some embodiments, source storage device 110 may refer to any device that can generate data and receive data transmission or backup services. In some embodiments, such devices include, but are not limited to, personal computers, tablet computers, laptop computers, notebook computers, netbook computers, any other type of computers, cellular or smart phones, media player devices, e-book devices, mobile WiFi devices, wearable devices, wireless devices, mobile devices, user devices, and any other type of electronic devices.

In some embodiments, storage manager 130 may include any device capable of implementing computing functions and/or control functions, including but not limited to, a dedicated computer, a general-purpose computer, a general-purpose processor, a micro-processor, a micro-controller, or a state machine.

In some embodiments, network 140 may be any form of connection or coupling that can achieve data communication or control signal communication between source storage device 110 and destination storage device 150, including but not limited to, coaxial cables, fiber-optic cables, twisted pairs, or wireless technology (such as infrared, radio, and microwaves). In some embodiments, network 140 may also include, but is not limited to, a device for network connection, such as a network card, a hub, a modem, a repeater, a network bridge, a switch, and a router, as well as various network connection lines, wireless links, and the like. In some embodiments, network 140 may include various types of buses. In other embodiments, network 140 may include a computer network, a communication network, or other wired or wireless networks.

It should be understood that FIG. 1 only schematically shows units, modules, or components related to the embodiments of the present disclosure in data transmission environment 100. In practice, data transmission environment 100 may further include other units, modules, or components for other functions. Accordingly, the embodiments of the present disclosure are not limited to specific devices, units, modules, or components depicted in FIG. 1, but are generally applicable to a system environment in which data transmission may be performed.

Method 200 for data transmission according to an embodiment of the present disclosure is described below with reference to FIG. 2. Method 200 may be performed at storage manager 130 or any other suitable devices in FIG. 1.

Figure 2:
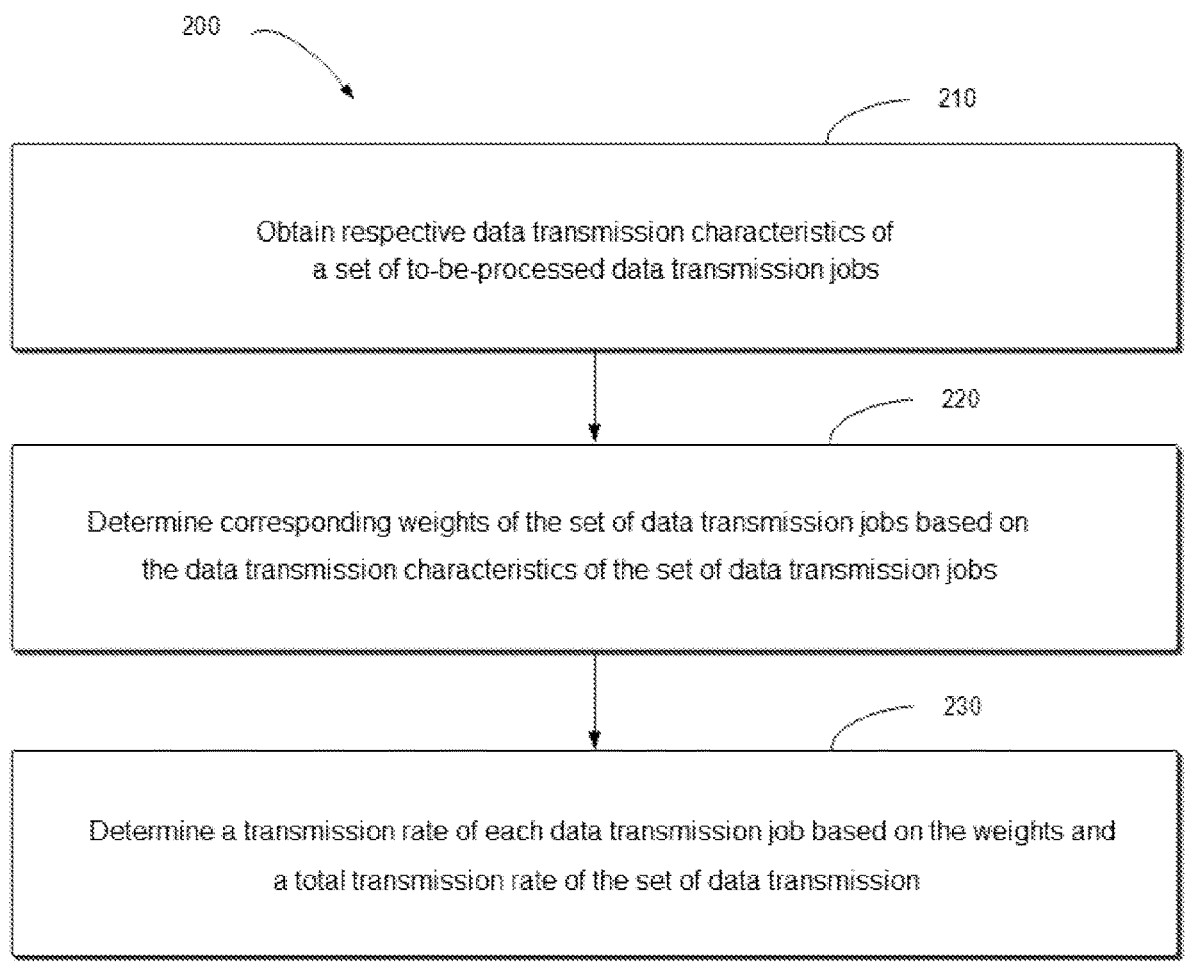
FIG. 2 shows a flow chart of method 200 for data transmission according to an embodiment of the present disclosure.

At block 210 in FIG. 2, storage manager 130 obtains respective data transmission characteristics of a set of to-be-processed data transmission jobs 120, and the data transmission characteristics of each data transmission job indicate at least one of an expected transmission time and a data size of the data transmission job. For example, storage manager 130 may obtain respective expected transmission times and data sizes of data transmission jobs 120-1, 120-2, and 120-3.

In some embodiments, the expected transmission time may be the longest duration allowed to execute the corresponding data transmission job. For example, in the field of data backup, the longest duration allowed for a transmission job may be a RPO, which may be measured in terms of time. For example, the RPO is one hour, indicating that data transmission is performed once every hour, which means that the data size that the system allows to lose is a data size in one hour. It is understandable that the data transmission must be completed within the RPO, otherwise the next data transmission cannot be performed.

In some embodiments, the expected transmission time may be preset, for example, by a user or an administrator of storage manager 130. Alternatively, in some embodiments, a storage system may also dynamically adjust the expected transmission time according to its own computing capability, which is not limited here in the present disclosure.

In some embodiments, data transmission may be performed for all contents in data transmission jobs 120-1, 120-2, and 120-3. In some embodiments, data transmission may be performed only for modified parts of data transmission jobs 120-1, 120-2, and 120-3, and an incremental data transmission can be performed.

It is to be noted that although the present disclosure only takes the expected transmission time and the data size as an example, it is understandable that there may also be other types of data transmission characteristics, such as types of data in a to-be-processed data transmission job.

At block 220 in FIG. 2, storage manager 130 determines corresponding weights of the set of data transmission jobs based on the data transmission characteristics of the set of data transmission jobs. For example, storage manager 130 may determine a more important data transmission job among data transmission jobs 120-1, 120-2, and 120-3 based on the expected transmission times and data sizes determined above, and assign a larger weight to the more important data transmission job.

In some embodiments, storage manager 130 first determines an importance level of the data transmission job based on the expected transmission time and the data size of each data transmission job, and then determines a weight of the data transmission job based on the importance level. For example, storage manager may determine the weight of the data transmission job according to the following equations (1) and (2):

$$E_i = \frac{D_i}{R_i} \quad \text{Equation (1)}$$

$$W_i = \frac{\frac{E_i}{R_i}}{\sum \frac{E_i}{R_i}} \quad \text{Equation (2)}$$

where $D_i$ is a data size to be transmitted in each data transmission job in a set of data transmission jobs, $R_i$ is an expected transmission time (for example, RPO) of each data transmission job in the set of data transmission jobs, $E_i$ is an expected transmission rate for completing transmission of a corresponding data size within the expected transmission time, and $W_i$ is a weight of each data transmission job in the set of data transmission jobs. It can be understood that the larger the data size to be transmitted, the lower the expected transmission rate (for example, RPO), which may indicate the higher the importance level of the corresponding data transmission job. Determination of the weights of data according to the data transmission characteristics before data transmission may lay a basis for subsequent assignment of transmission rates. Thus, a higher transmission rate may be assigned to data with a high importance level in the case that the total transmission rate is limited.

It is to be noted that the above equation (2) is only an example, and different weight calculation methods can be set as needed, for example, a higher priority is set for the expected transmission rate, that is, the denominator of equation (2) becomes $R_i^n$. The present disclosure is not limited here.

At block 230 in FIG. 2, storage manager 130 determines a transmission rate for each data transmission job based on the weights and the total transmission rate for the set of data transmission jobs. The method for determining the transmission rate will be described in detail below in conjunction with FIG. 3 and FIG. 4.

Figure 3:
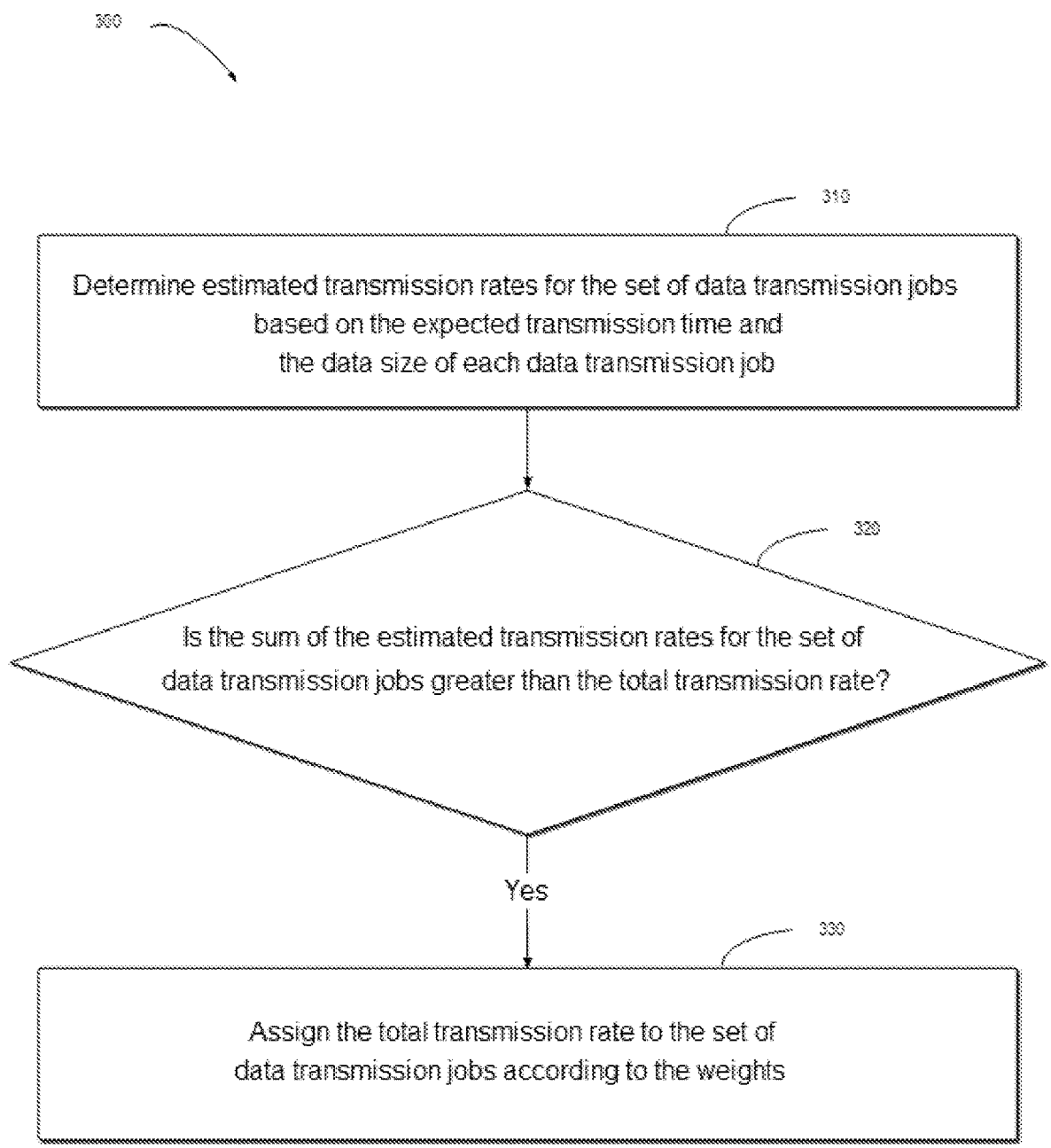
FIG. 3 shows a flow chart of determining transmission rate 300 according to an embodiment of the present disclosure.

FIG. 3 shows a flow chart of determining transmission rate 300 according to an embodiment of the present disclosure. At block 310 in FIG. 3, storage manager 130 determines estimated transmission rates for the set of data transmission jobs based on the expected transmission time and the data size of each data transmission job. For example, storage manager 130 may obtain the respective expected transmission times and data sizes of data transmission jobs 120-1, 120-2, and 120-3, and then determine respective estimated transmission rates according to the above equation (1). For clarity, it will be described in conjunction with Table 1. It is to be noted that physical quantity units below are only an example and are not intended to limit the scope of the present disclosure.

TABLE 1

| Data transmission job | Expected transmission time (min) | data size (MB) | Estimated transmission rate (MB/min) |
|---|---|---|---|
| 120-1 | 5 | 1000 | 200 |
| 120-2 | 10 | 1000 | 100 |
| 120-3 | 20 | 100 | 5 |

At block 320 in FIG. 3, storage manager 130 determines whether the sum of the estimated transmission rates of the set of data transmission jobs 120 is greater than the total transmission rate. Storage manager 130 may determine the total transmission rate of the storage system. The total transmission rate may be a maximum transmission rate available for the storage system or a transmission rate pre-assigned to the set of data transmission jobs 120. For example, storage manager 130 determines that the total transmission rate is 300, then determines that the sum of the estimated transmission rates is 305 according to Table 1, and accordingly determines that the sum of the estimated transmission rates of the set of data transmission jobs 120 is greater than the total transmission rate. It can be understood that in this case, if the transmission is performed according to the conventional data transmission methods, some or all of the data transmission jobs in the set of data transmission jobs 120 may not be completed within the expected transmission time (RPO). For example, according to the conventional methods, situations presented in Table 2 will occur:

TABLE 2

| Data transmission job | Expected transmission time (min) | Data size (MB) | Completion time (min) |
|---|---|---|---|
| 120-1 | 5 | 1000 | 7 |
| 120-2 | 10 | 1000 | 7 |
| 120-3 | 20 | 100 | 1 |

At block 330 in FIG. 3, storage manager 130 assigns the total transmission rate to the set of data transmission jobs according to the weights. When storage manager 130 determines that the sum of the estimated transmission rates of a set of data transmission jobs 120 is greater than the total transmission rate, storage manager 130 may determine respective weights $W_1=0.796$; $W_2=0.199$; and $W_3=0.005$ of data transmission jobs 120-1, 120-2, and 120-3 according to the above equation (2). Respective transmission rates of the data transmission jobs are then determined according to equation (3).

$$S_i = L_i * W_i \quad \text{Equation (3)}$$

where $S_i$ is a transmission rate assigned to the corresponding data transmission job, and $L_i$ is the total transmission rate. Storage manager 130 may determine Table 3 according to equation (3):

TABLE 3

| Data transmission job | Expected transmission time (min) | Data size (MB) | Transmission rate (MB/min) |
|---|---|---|---|
| 120-1 | 5 | 1000 | 238.8 |
| 120-2 | 10 | 1000 | 59.7 |
| 120-3 | 20 | 100 | 1.5 |

It can be seen from Table 3 that a high transmission rate is assigned to a data transmission job with a large weight (a high importance level). Thus, the RPO completion rate may be increased when the total transmission rate of the system is limited. In addition, it can be seen from the above equations that the method has low complexity in implementation, requires low computing power, and further lowers hardware cost.

In some embodiments, if storage manager 130 determines that data transmission job 120-1 in a set of data transmission jobs 120 has been completed, it determines data transmission characteristics of remaining data transmission jobs 120-2 and 120-3 in the set of data transmission jobs 120 excluding data transmission job 120-1. Storage manager 130 then updates weights based on the data transmission characteristics of the remaining data transmission jobs 120-2 and 120-3. And finally, based on the updated weights, the transmission rates for executing the remaining data transmission jobs 120-2 and 120-3 are determined.

For example, continuing with the above example, data transmission job 120-1 is completed in 4.188 minutes. Then storage manager 130 may update the weights $W_2'=0.956$; $W_3'=0.044$ according to remaining data sizes and remaining expected transmission times of the remaining data transmission jobs 120-2 and 120-3, and then assign the transmission rates according to the updated weights, as shown in Table 4:

TABLE 4

| Data transmission job | Remaining expected transmission time (min) | Data size (MB) | Transmission rate (MB/min) |
|---|---|---|---|
| 120-1 | / | / | / |
| 120-2 | 5.812 | 750 | 286.812 |
| 120-3 | 15.812 | 93.719 | 13.188 |

According to the re-assigned transmission rate, data transmission job 120-2 is completed within 2.615 minutes, and then the total transmission rate of the storage system is assigned to data transmission job 120-3. Completion of a set of data transmission jobs 120 is shown in Table 5:

TABLE 5

| Data transmission job | Expected transmission time (min) | Data size (MB) | Completion time (min) |
|---|---|---|---|
| 120-1 | 5 | 1000 | 4.188 |
| 120-2 | 10 | 1000 | 6.803 |
| 120-3 | 20 | 100 | 7 |

It can be seen that, different from the results shown in Table 2 obtained by the conventional methods, each data transmission job in the set of data transmission jobs 120 is completed within the expected transmission time. Thus, the RPO completion rate of output transmission may be increased, and the user experience of the storage system may be improved.

The above embodiments describe the case where the sum of the estimated transmission rates exceeds the total transmission rate of the system. The following describes the case where the sum of the estimated transmission rates does not exceed the total transmission rate of the system with reference to FIG. 4.

Figure 4:
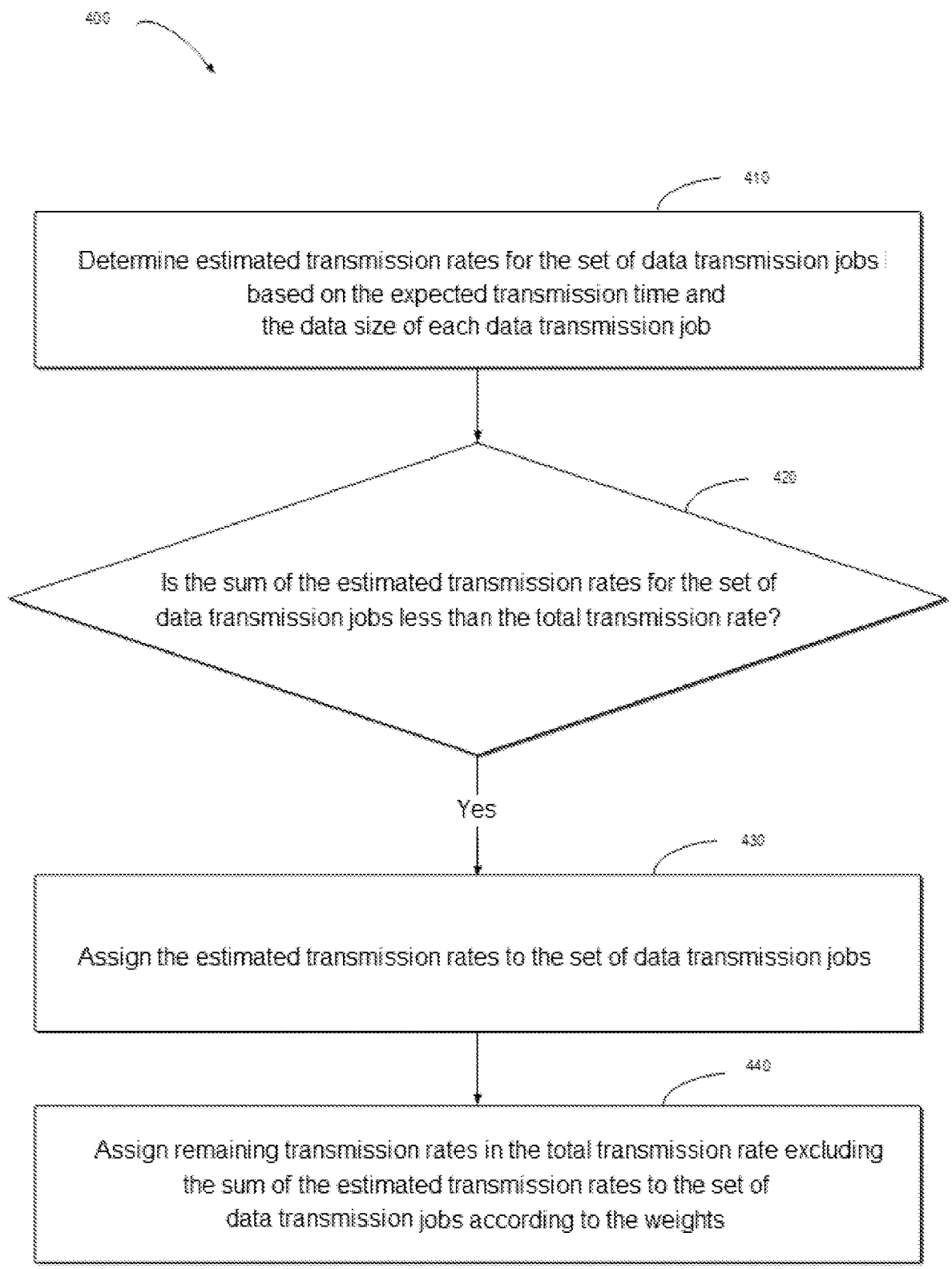
FIG. 4 shows a flow chart of determining transmission rate 400 according to another embodiment of the present disclosure.

FIG. 4 shows a flow chart of determining transmission rate 400 according to another embodiment of the present disclosure. At block 410 in FIG. 4, storage manager 130 determines estimated transmission rates for the set of data transmission jobs based on the expected transmission time and the data size of each data transmission job. At block 420 in FIG. 4, storage manager 130 determines that the sum of the estimated transmission rates of the set of data transmission jobs is less than the total transmission rate. Steps 410 and 420 are similar to the foregoing steps 310 and 320, and will not be elaborated here.

At block 430 in FIG. 4, storage manager 130 assigns the estimated transmission rates to the set of data transmission jobs. For example, when determining that the sum of the estimated transmission rates of the set of data transmission jobs is less than the total transmission rate, storage manager 130 first assigns the respective estimated transmission rates to the corresponding data transmission jobs to ensure that they can be completed within the expected transmission times.

At block 440 in FIG. 4, storage manager 130 assigns remaining transmission rates in the total transmission rate excluding the sum of the estimated transmission rates to the set of data transmission jobs according to the weights. For example, storage manager 130 may assign the remaining transmission rates according to the above-mentioned weights, see the following equation (4):

$$S_i = E_i + (L_i - \Sigma E_i) * W_i \qquad \text{Equation (4)}$$

where $E_i$ is an expected transmission rate for completing transmission of the corresponding data size within an expected transmission time, $W_i$ is a weight of each data transmission job in a set of data transmission jobs, $S_i$ is a transmission rate assigned to the corresponding data transmission job, and $L_i$ is the total transmission rate. The foregoing method has the advantages that even when the total transmission rate is sufficient to realize the expected transmission time of each data transmission job, data transmission jobs with a high importance level may be preferentially executed according to the weights.

According to the embodiments of the present disclosure, the RPO completion rate in data transmission (especially asynchronous replication) may be increased, and the method has low complexity, requires low cost for hardware/software, and may not affect system performance. Therefore, user experiences may be improved.

It is to be noted that the above example of weight determination is only illustrative, and the weight can also be determined according to other data transmission characteristics. For example, a priority of data transmission may be determined according to types of data in a to-be-processed data transmission job, for example, data transmission in text format is preferred. Different weights and priorities can be set according to different application scenarios, which is not limited here in the present disclosure.

Figure 5:
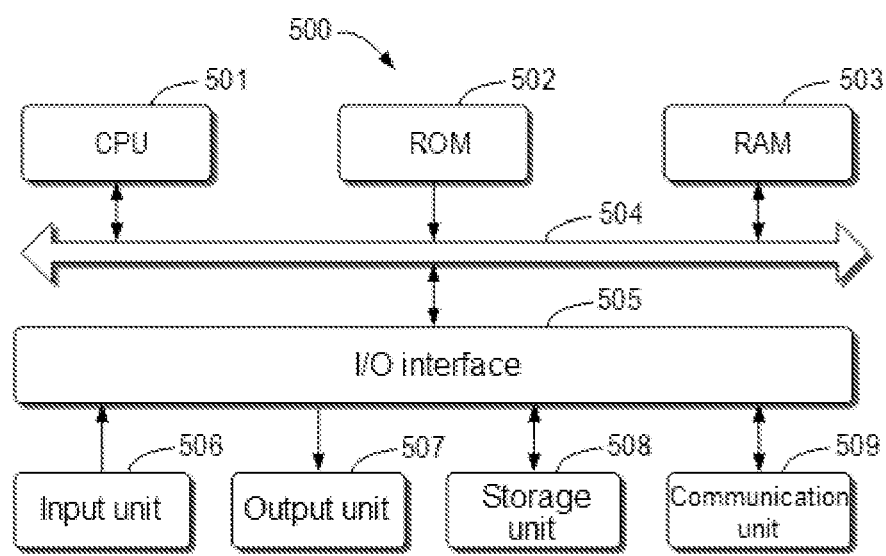
FIG. 5 shows a schematic block diagram of example device 500 that may be configured to implement an embodiment of the present disclosure.

FIG. 5 is a schematic block diagram of example device 500 that may be configured to implement an embodiment of content of the present disclosure. For example, storage manager 130 as shown in FIG. 1 may be implemented by device 500. As shown in the drawing, device 500 includes central processing unit CPU 501 that may perform various appropriate actions and processing according to computer program instructions stored in read-only memory ROM 502 or computer program instructions loaded from storage unit 508 into random access memory RAM 503. In RAM 503, various programs and data required for the operation of storage device 500 may also be stored. CPU 501, ROM 502, and RAM 503 are connected to each other through bus 504. Input/output I/O interface 505 is also connected to bus 504.

Multiple components in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices through a computer network such as the Internet and/or various telecommunication networks.

The various processes and processing described above, for example, methods 200, 300, and 400, can be performed by processing unit 501. For example, in some embodiments, methods 200, 300, and 400 may be implemented as a computer software program that is tangibly included in a machine-readable medium such as storage unit 508. In some embodiments, part or all of the computer program may be loaded and/or mounted to device 500 via ROM 502 and/or communication unit 509. When the computer program is loaded to RAM 503 and executed by CPU 501, one or more actions in methods 200, 300, and 400 described above can be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples, as a non-exhaustive list, of computer-readable storage media include: a portable computer disk, a hard disk, a random access memory RAM, a read-only memory ROM, an erasable programmable read-only memory EPROM or a flash memory, a static random access memory SRAM, a portable compact disc read-only memory CD-ROM, a digital versatile disc DVD, a memory stick, a floppy disk, a mechanical encoding device, for example, a punch card or a raised structure in a groove with instructions stored thereon, and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signal transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for performing the operations of the present disclosure may be assembly instructions, Instruction Set Architecture ISA instructions, machine instructions, machine-related instructions, microcode, firmware instructions, status setting data, or source code or object code written in any combination of one or more programming languages, including object-oriented programming languages, such as Smalltalk and C++, as well as conventional procedural programming languages, such as C language or similar programming languages. The computer-readable program instructions may be executed entirely on a user computer, partly on a user computer, as a standalone software package, partly on a user computer and partly on a remote computer, or entirely on a remote computer or a server. In the case where a remote computer is involved, the remote computer may be connected to a user computer over any kind of networks, including a local area network (LAN) or a wide area network (WAN), or may be connected to an external computer (e.g., connected over the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus/system, and the computer program product according to the embodiments of the present disclosure. It should be understood that each block in the flow charts and/or block diagrams as well as a combination of blocks in the flow charts and/or block diagrams may be implemented by using the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for data transmission, comprising:
obtaining respective data transmission characteristics of a set of to-be-processed data transmission jobs, each data transmission job comprising asynchronous replication to a destination storage device, the data transmission characteristics of each data transmission job indicating at least one of an expected transmission time and a data size of the data transmission job;
determining corresponding weights of the set of data transmission jobs based on the data transmission characteristics of the set of data transmission jobs; and
determining a transmission rate of each data transmission job based on the weights and a total transmission rate used for the set of data transmission, at least in part by
determining estimated transmission rates for the set of data transmission jobs based on the expected transmission time and the data size of each data transmission job, wherein the expected transmission time of each transmission job is the longest time duration allowed to execute the transmission job, and
when determining that a sum of the estimated transmission rates of the set of data transmission jobs is greater than the total transmission rate, assigning the total transmission rate to the set of data transmission jobs according to the weights.

2. The method according to claim 1, wherein determining the corresponding transmission rate for the corresponding job comprises:
when determining that a sum of the estimated transmission rates of the set of data transmission jobs is less than the total transmission rate, assigning the estimated transmission rates to the set of data transmission jobs; and
according to the weights, assigning remaining transmission rates in the total transmission rate excluding the sum of the estimated transmission rates to the set of data transmission jobs.

3. The method according to claim 1, wherein determining the corresponding weights of the set of data transmission jobs comprises:
determining an importance level of each data transmission job based on the expected transmission time and the data size of the data transmission job; and
determining the weights of the data transmission jobs based on the importance levels.

4. The method according to claim 1, further comprising:
when determining that one data transmission job in the set of data transmission jobs has been completed, determining the data transmission characteristics of the remaining data transmission jobs excluding the data transmission job in the set of data transmission jobs;

updating the weights based on the data transmission characteristics of the remaining data transmission jobs; and determining the transmission rates for executing the remaining data transmission jobs based on the updated weights.

5. The method according to claim 1, wherein the longest time duration allowed to execute each transmission job is a recovery point objective for the transmission job.

6. The method according to claim 1, wherein the asynchronous replication of each transmission job comprises snapshot-based asynchronous replication to the destination storage device.

7. An electronic device, the electronic device comprising:
at least one processor; and
a memory coupled to the at least one processor and having instructions stored thereon, wherein the instructions, when executed by the at least one processor, cause the device to perform actions comprising:
obtaining respective data transmission characteristics of a set of to-be-processed data transmission jobs, each data transmission job comprising asynchronous replication to a destination storage device, the data transmission characteristics of each data transmission job indicating at least one of an expected transmission time and a data size of the data transmission job;
determining corresponding weights of the set of data transmission jobs based on the data transmission characteristics of the set of data transmission jobs; and
determining a transmission rate of each data transmission job based on the weights and a total transmission rate used for the set of data transmission, at least in part by
determining estimated transmission rates for the set of data transmission jobs based on the expected transmission time and the data size of each data transmission job, wherein the expected transmission time of each transmission job is the longest time duration allowed to execute the transmission job, and
when determining that a sum of the estimated transmission rates of the set of data transmission jobs is greater than the total transmission rate, assigning the total transmission rate to the set of data transmission jobs according to the weights.

8. The electronic device according to claim 7, wherein determining the corresponding transmission rate for the corresponding job comprises:
when determining that the sum of the estimated transmission rates of the set of data transmission jobs is less than the total transmission rate, assigning the estimated transmission rates to the set of data transmission jobs; and according to the weights, assigning remaining transmission rates in the total transmission rate excluding the sum of the estimated transmission rates to the set of data transmission jobs.

9. The electronic device according to claim 7, wherein determining the corresponding weights of the set of data transmission jobs comprises:
determining an importance level of the data transmission job based on the expected transmission time and the data size of each data transmission job; and
determining the weights of the data transmission jobs based on the importance levels.

10. The electronic device according to claim 7, further comprising:
when determining that one data transmission job in the set of data transmission jobs is completed, determining the data transmission characteristics of the remaining data transmission jobs excluding the data transmission job in the set of data transmission jobs;
updating the weights based on the data transmission characteristics of the remaining data transmission jobs; and
determining the transmission rates for executing the remaining data transmission jobs based on the updated weights.

11. A computer program product having a non-transitory computer readable medium which stores a set of instructions to perform data transmission; the set of instructions, when carried out by computerized circuitry, causing the computerized circuitry to perform a method of:
obtaining respective data transmission characteristics of a set of to-be-processed data transmission jobs, each data transmission job comprising asynchronous replication to a destination storage device, the data transmission characteristics of each data transmission job indicating at least one of an expected transmission time and a data size of the data transmission job;
determining corresponding weights of the set of data transmission jobs based on the data transmission characteristics of the set of data transmission jobs; and
determining a transmission rate of each data transmission job based on the weights and a total transmission rate used for the set of data transmission, at least in part by
determining estimated transmission rates for the set of data transmission jobs based on the expected transmission time and the data size of each data transmission job, wherein the expected transmission time of each transmission job is the longest time duration allowed to execute the transmission job, and
when determining that a sum of the estimated transmission rates of the set of data transmission jobs is greater than the total transmission rate, assigning the total transmission rate to the set of data transmission jobs according to the weights.

* * * * *